(12) United States Patent
Tanida et al.

(10) Patent No.: US 11,891,969 B2
(45) Date of Patent: Feb. 6, 2024

(54) FUEL-FEEDING DEVICE

(71) Applicant: AISAN KOGYO KABUSHIKI KAISHA, Obu (JP)

(72) Inventors: Yuya Tanida, Obu (JP); Keita Suzuki, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/994,645

(22) Filed: Nov. 28, 2022

(65) Prior Publication Data

US 2023/0167791 A1 Jun. 1, 2023

(30) Foreign Application Priority Data

Nov. 29, 2021 (JP) ................. 2021-192825

(51) Int. Cl.
*F02M 37/10* (2006.01)
*F02M 37/00* (2006.01)
*F02D 33/00* (2006.01)
*B60K 15/03* (2006.01)

(52) U.S. Cl.
CPC ......... *F02M 37/0058* (2013.01); *B60K 15/03* (2013.01); *F02D 33/003* (2013.01); *F02M 37/007* (2013.01); *F02M 37/0017* (2013.01); *F02M 37/0082* (2013.01); *F02M 37/10* (2013.01); *B60K 2015/0321* (2013.01);
(Continued)

(58) Field of Classification Search
CPC ............. F02M 25/089; F02M 37/0052; F02M 37/0076; F02M 37/0082; F02M 37/02; F02M 37/10; F02M 2037/082; F02M 37/04; F02M 33/08; F02M 33/00; B60K 15/03504; B60K 2015/03243; B60K 2015/03256; B60K 15/03
See application file for complete search history.

(56) References Cited

U.S. PATENT DOCUMENTS 6,889,656 B1 * 5/2005 Rembold ............ F02D 41/3082
123/446
2004/0065144 A1 * 4/2004 Mitani ................. F02M 37/106
73/114.45

(Continued)

FOREIGN PATENT DOCUMENTS

CN 105937464 A * 9/2016 ......... F02M 25/0836
CN 108367671 A * 8/2018 ............. B60K 15/03
(Continued)

*Primary Examiner* — George C Jin
*Assistant Examiner* — Teuta B Holbrook
(74) *Attorney, Agent, or Firm* — CONLEY ROSE, P.C.

(57) ABSTRACT

A fuel-feeding device may include a fuel tank storing fuel therein, a fuel pump configured to feed the fuel in the fuel tank to an engine through a fuel-feeding conduit, an aspirator configured to generate a negative pressure therein using a flow of the fuel flowing through a branched conduit branched from the fuel-feeding conduit, a negative pressure sensor configured to detect the negative pressure generated by the aspirator, and a control device configured to control a revolution speed of the fuel pump. The control device is configured to determine a sign of vapor generation in the fuel stored in the fuel tank based on detection information of the negative pressure sensor.

5 Claims, 1 Drawing Sheet

(52) U.S. Cl.
CPC ............... *B60K 2015/03243* (2013.01); *B60K 2015/03256* (2013.01)

(56) References Cited

U.S. PATENT DOCUMENTS

| | | | | |
|---|---|---|---|---|
| 2010/0274467 A1* | 10/2010 | Hayami | ............. | F02D 41/2438 |
| | | | | 701/103 |
| 2010/0294251 A1* | 11/2010 | Makino | ................. | F02M 37/20 |
| | | | | 123/519 |
| 2011/0186020 A1* | 8/2011 | Makino | ............. | F02M 25/0809 |
| | | | | 123/521 |
| 2020/0095963 A1* | 3/2020 | Fujiseki | ........... | B60K 15/03006 |
| 2020/0102904 A1* | 4/2020 | Dudar | .................... | F02D 41/22 |
| 2020/0378345 A1* | 12/2020 | Dudar | ................. | F02M 25/089 |

FOREIGN PATENT DOCUMENTS

| | | | | | |
|---|---|---|---|---|---|
| JP | 2005299558 | A | * | 10/2005 | ............. F02M 25/08 |
| JP | 2010138706 | A | * | 6/2010 | ........... F02D 33/003 |
| JP | 2010275879 | A | * | 12/2010 | |
| JP | 2017137874 | A | | 8/2017 | |
| JP | 2019196752 | A | * | 11/2019 | ......... F02M 25/0836 |
| JP | 2021021360 | A | * | 2/2021 | |
| WO | WO-2018114128 | A1 | * | 6/2018 | |

\* cited by examiner

FUEL-FEEDING DEVICE

CROSS-REFERENCE TO RELATED APPLICATIONS

This application claims priority to Japanese patent application serial number 2021-192825 filed Nov. 29, 2021, which is hereby incorporated herein by reference in its entirety for all purposes.

BACKGROUND

The present disclosure relates generally to a fuel-feeding device. More particularly, the present disclosure relates to a fuel-feeding device for a vehicle.

Conventionally, a fuel-feeding device for a vehicle includes a fuel pump for feeding fuel in a fuel tank to an engine through a fuel-feeding conduit, a pressure sensor configured to detect a pressure (fuel pressure) of the fuel ejected into the fuel-feeding conduit by the fuel pump, and a control unit configured to control a revolution speed of the fuel pump. Generally, when the vehicle is used under a high temperature and low pressure environment, fuel in a fuel tank tends to generate vapors (gas bubbles) therein. Such vapors generated in the fuel may cause vapor lock of the fuel pump of the fuel-feeding device. The vapor lock of the fuel pump may cause serious problems such as engine stall or re-start delay.

In the conventional fuel-feeding device, the control unit is configured to determine that the vapors have been generated in the fuel (i.e., the vapor lock of the fuel pump has occurred) when the fuel pressure detected by the pressure sensor falls below a threshold value, thereby increasing the revolution speed of the fuel pump.

SUMMARY

For example, in one aspect of the present disclosure, a fuel-feeding device may include a fuel tank storing fuel therein, a fuel pump configured to feed the fuel in the fuel tank to an engine through a fuel-feeding conduit, an aspirator configured to generate a negative pressure therein using a flow of the fuel flowing through a branched conduit extending from the fuel-feeding conduit, a negative pressure sensor configured to detect the negative pressure generated by the aspirator, and a control device configured to control a revolution speed of the fuel pump. The control device is configured to determine a sign of vapor generation in the fuel stored in the fuel tank based on detection information of the negative pressure sensor and to increase the revolution speed of the fuel pump when such a sign is determined.

According to the aspect, the control device may determine the sign of vapor generation in the fuel stored in the fuel tank based on the detection information of the negative pressure sensor configured to detect the negative pressure generated by the aspirator. Generally, the negative pressure detected by the negative pressure sensor is a compensated pressure, which corresponds to a negative pressure actually generated by a Venturi effect of the aspirator and compensated by a vapor pressure that is generated by vaporization of the fuel introduced into the aspirator under reduced pressure. Thus, when the negative pressure detected by the negative pressure sensor is reduced to a level lower than a predetermined negative pressure, i.e., a negative pressure that is normally generated by the aspirator, the control device determines that such a reduction of the detected negative pressure is the sign of vapor generation in the fuel stored in the fuel tank. Upon determination of the sign of vapor generation in the fuel, the control device increases the revolution speed of the fuel pump. As a result, vapor lock of the fuel pump can be prevented.

Other objects, features, and advantages, of the present disclosure will be readily understood after reading the following detailed description together with the accompanying drawings and the claims.

DETAILED DESCRIPTION

As previously described, one known fuel-feeding device typically includes a fuel pump for feeding fuel in a fuel tank to an engine through a fuel-feeding conduit, a pressure sensor configured to detect a pressure of the fuel ejected into the fuel-feeding conduit by the fuel pump, and a control unit configured to control a revolution speed of the fuel pump. Such a known fuel-feeding device is taught by, for example, in Japanese Laid-Open Patent Publication No. 2017-137874 (JP2017-137874A). In such fuel-feeding device, the control unit is configured to determine that the vapors have been generated in the fuel (i.e., the vapor lock of the fuel pump has occurred) when the fuel pressure detected by the pressure sensor falls below a threshold value, thereby increasing the revolution speed of the fuel pump. This means that the control unit does not control the fuel pump unless the vapors are actually generated in the fuel (i.e., unless the vapor lock of the fuel pump actually occurs). That is, in the fuel-feeding device, the vapor lock of the fuel pump cannot be prevented before it occurs. Thus, there is a need in the art for an improved fuel-feeding device.

Next, a representative embodiment of the present disclosure will be described with reference to the drawings.

Figure 1:
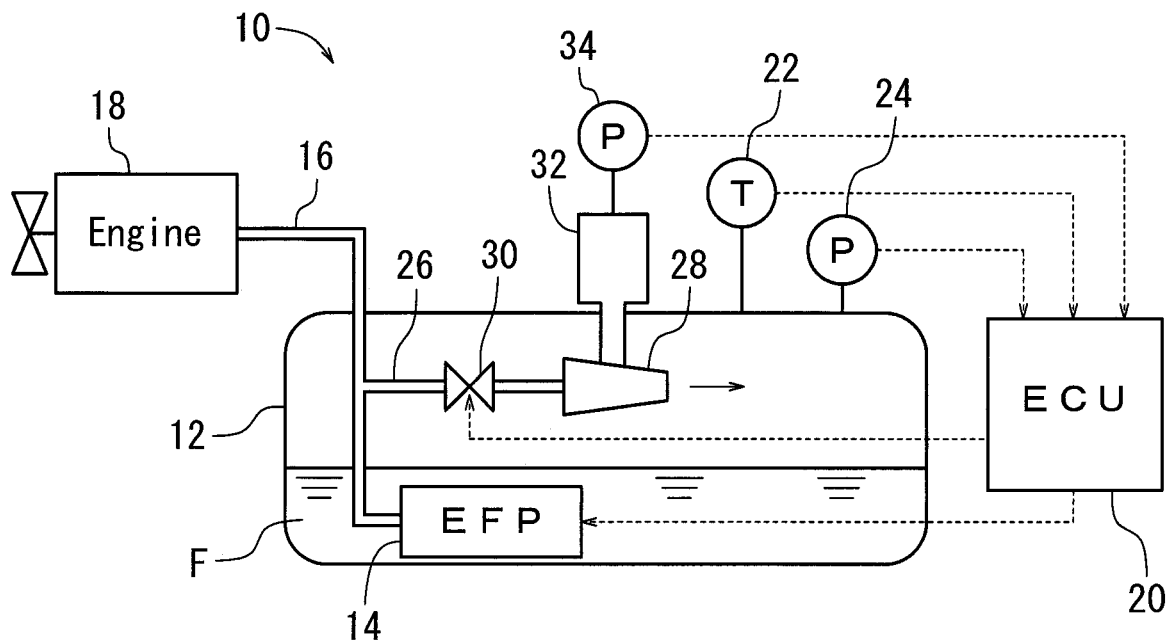
FIG. 1 is a schematic view of an embodiment of a fuel-feeding device in accordance with principles described herein, which illustrates a condition in which a fuel-feeding device is attached to a fuel tank.

Referring now to FIG. 1, an embodiment of a fuel-feeding device 10 for a vehicle such as an automobile is shown. In this embodiment, the fuel-feeding device 10 includes a hermetically sealed fuel tank 12 and a (electric) fuel pump 14 disposed in the fuel tank 12. The fuel pump 14 is generally positioned on a bottom of the fuel tank 12. Further, the fuel pump 14 is in fluid communication with an engine (internal combustion engine) 18 via a fuel-feeding pipe or conduit 16. The fuel tank 12 generally stores highly volatile liquid fuel F such as gasoline. The fuel pump 14 feeds the fuel F in the fuel tank 12 to the engine 18 through the fuel-feeding conduit 16.

As shown in FIG. 1, the fuel pump 14 is electrically connected to an ECU (electronic control unit) 20. The ECU 20 typically includes a CPU (central processing unit), a ROM (read only memory), and a RAM (random access memory). In the ECU 20, the CPU performs an arithmetic processing or operation based on basic control programs stored in the ROM, thereby controlling the fuel pump 14, or other such elements electrically connected to the ECU 20. Further, the ECU 20 may be referred to herein as a "control device."

As shown in FIG. 1, the fuel tank 12 is provided with a gas phase temperature sensor 22 and a tank inner pressure sensor 24. The gas phase temperature sensor 22 is configured to detect a temperature of a gas phase in the fuel tank 12 (such temperature may be referred to herein as a "gas phase temperature"). The tank inner pressure sensor 24 is configured to detect a pressure of the gas phase in the fuel tank 12 (such pressure may be referred to as a "tank inner pressure"). The gas phase temperature sensor 22 and the tank inner pressure sensor 24 are electrically connected to the ECU 20 such that detection signals therefrom are input into the ECU 20.

As shown in FIG. 1, an aspirator 28 is disposed in the gas phase in the fuel tank 12. The aspirator 28 is in fluid communication with the fuel-feeding conduit 16 via a branched pipe or conduit 26 extending from an intermediate portion of the fuel-feeding conduit 16. Accordingly, the fuel F flowing through the fuel-feeding conduit 16 can be partially introduced into the aspirator 28 through the branched conduit 26, so as to be ejected back into the fuel tank 12 via the aspirator 28 (as shown by an arrow line in FIG. 1). Further, the aspirator 28 generates a negative pressure in a depressurized portion or negative pressure generating portion (not shown) formed therein using a flow of the fuel F flowing through the branched conduit 26.

As shown in FIG. 1, the branched conduit 26 is provided with an on-off valve 30 along an intermediate portion thereof. In this embodiment, the on-off valve 30 is an electromagnetic valve that is electrically connected to the ECU 20. The on-off valve 30 is controllably opened and closed by the ECU 20. In particular, the on-off valve 30 is a normally open electromagnetic valve that is configured to be steadily opened when electric current is not applied (in a normal state) and closed when electric current is applied.

As shown in FIG. 1, the negative pressure generating portion (depressurized portion) of the aspirator 28 is in fluid communication with a hermetically sealed negative pressure chamber 32. The negative pressure chamber 32 is provided with a negative pressure sensor 34. The negative pressure sensor 34 is configured to detect a pressure (negative pressure) in an interior space of the negative pressure chamber 32. The negative pressure sensor 34 is electrically connected to the ECU 20 such that detection signals therefrom are input into the ECU 20.

Next, an operation of the fuel-feeding device 10 will be described. The ECU 20 is configured to start to control the fuel-feeding device 10 in conjunction with start-up of the engine 18. In particular, control of the fuel pump 14 by the ECU 20 is started in conjunction with start-up of the engine 18. Upon start-up of the engine 18, the ECU 20 sets a revolution speed of the fuel pump 14 to an initial revolution speed corresponding to a target pressure (target fuel pressure) of the fuel F needed for the engine 18, and then supplies an electric power to the fuel pump 14, thereby activating the fuel pump 14. Further, the revolution speed of the fuel pump 14 typically corresponds a revolution speed of a motor in a driving portion (not shown) of the fuel pump 14 and a revolution speed of an impeller in a pumping portion (not shown) of the fuel pump 14.

Upon activation of the fuel pump 14, the fuel F in the fuel tank 12 is drawn up and pressurized by the fuel pump 14, and is then ejected into the fuel-feeding conduit 16. The fuel F ejected into the fuel-feeding conduit 16 is fed to the engine 18 through the fuel-feeding conduit 16. Further, when the fuel F is drawn up and pressurized by the fuel pump 14, a constant or predetermined negative pressure may be generated in the fuel pump 14 (in particular, in the pumping portion of the fuel pump 14).

As previously described, a portion of the fuel F flowing through the fuel-feeding conduit 16 is introduced into the aspirator 28 through the branched conduit 26, and is then ejected into the fuel tank 12 via the aspirator 28 (as shown by an arrow line in FIG. 1). The aspirator 28 generates the negative pressure in the negative pressure generating portion formed therein using the flow of the fuel F flowing through the branched conduit 26. Further, the aspirator 28 normally has constant ejecting performance (ejecting amount of flow). Such a negative pressure generated in the aspirator 28 acts on the negative pressure chamber 32. Thus, the negative pressure is detected by the negative pressure sensor 34 attached to the negative pressure chamber 32. The detection signals of the negative pressure sensor 34 are input into the ECU 20.

Figure 2:
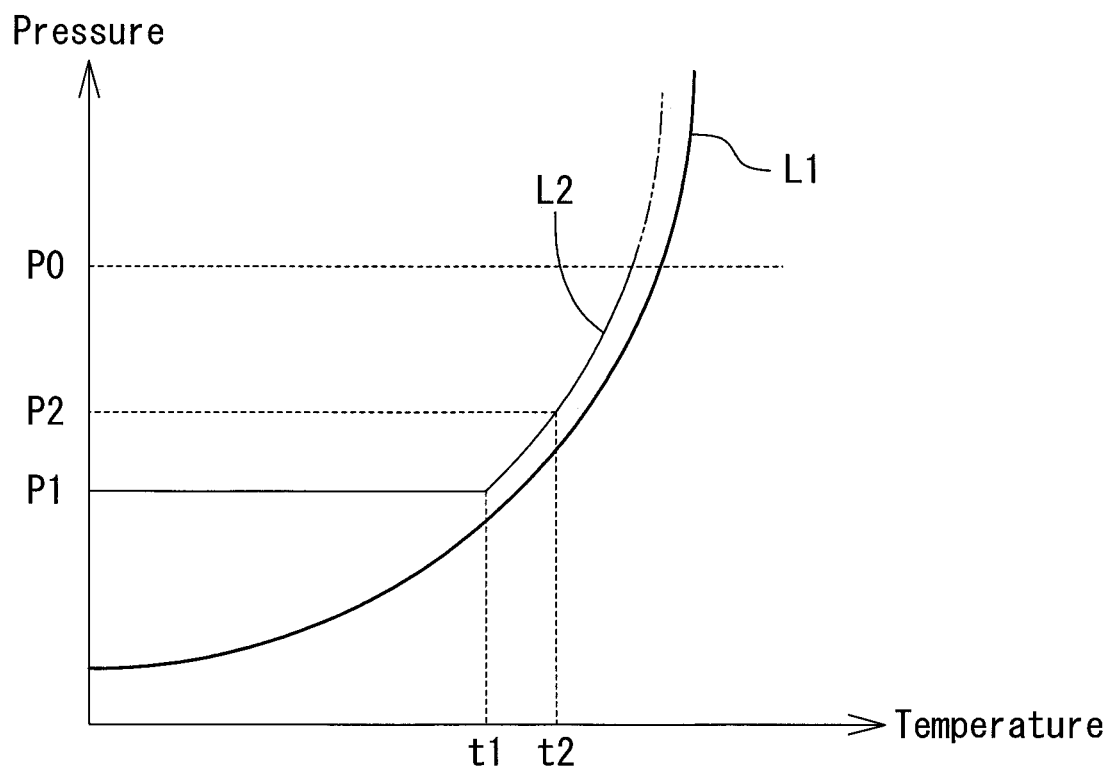
FIG. 2 is a graph illustrating a relationship between a negative pressure generated in an aspirator disposed in the fuel tank and a temperature of fuel stored in the fuel tank, which is shown in relation to a temperature-saturated vapor pressure curve of the fuel.

The ECU 20 stores a saturated vapor pressure characteristic of the fuel F fed to the engine 18, i.e., a temperature-saturated vapor pressure curve L1 of the fuel F showing a relationship between a saturated vapor pressure (saturated fuel vapor pressure) of the fuel F and a temperature (fuel temperature) of the fuel F, which is shown in FIG. 2.

As shown in FIG. 2, when a fuel property of the fuel F is in an area above the temperature-saturated vapor pressure curve L1, i.e., when the tank inner pressure and the fuel temperature are in the area above the temperature-saturated vapor pressure curve L1, the fuel F stably exists in a liquid state (liquid phase). To the contrary, when the fuel property of the fuel F is in an area below the temperature-saturated vapor pressure curve L1, i.e., when the tank inner pressure and the fuel temperature are in the area below the temperature-saturated vapor pressure curve L1, the fuel F generates vapors (fuel vapors) therein due to boiling under reduced pressure. The vapors generated in the fuel F may cause vapor lock of the fuel pump 14. Further, in FIG. 2, a pressure P0 corresponds to an atmospheric pressure.

As shown in FIG. 2, when the temperature of the fuel F is lower than a temperature t1, the aspirator 28 generates a predetermined negative pressure P1. Further, the negative pressure detected by the negative pressure sensor 34 is not a pure negative pressure generated exclusively by a Venturi effect of the aspirator 28 but a compensated pressure in which such a negative pressure generated by the aspirator 28 is compensated by a vapor pressure generated by vaporization of the fuel F introduced into the aspirator 28 under reduced pressure. Therefore, when the temperature of the fuel F is increased to a temperature t1 or more, the negative pressure detected by the negative pressure sensor 34 (which may be referred to herein as a "detected negative pressure") is gradually reduced with increasing temperature as shown by a curve L2 in FIG. 2. The curve L2 is a temperature-negative pressure curve in which the detected negative pressure at a certain temperature is lower than the saturated vapor pressure in the temperature-saturated vapor pressure curve L1 by a substantially constant amount of pressure. For example, at a temperature t2 of the fuel F higher than the temperature t1, the detected negative pressure is reduced to a negative pressure P2. The negative pressure P2 is lower than the negative pressure P1 and is lower than the saturated vapor pressure by a certain amount of pressure. Such a reduction of the detected negative pressure is considered to be a sign or indication of vapor generation in the fuel F stored in the fuel tank 12. Thus, when the detected negative pressure is reduced to a level lower than the negative pressure P1 that is normally generated by the aspirator 28, the ECU 20 determines that such a reduction of the detected negative pressure is the sign of vapor generation in the fuel F stored in the fuel tank 12.

Upon determination of the sign of vapor generation in the fuel F, the ECU 20 increases the revolution speed of the fuel pump 14. As a result, vapor lock of the fuel pump 14 can be prevented. Thereafter, when the detected negative pressure is returned to the negative pressure P1 that is normally generated by the aspirator 28, the ECU 20 again reduces the revolution speed of the fuel pump 14 to the initial revolution speed.

Further, the ECU 20 revises the negative pressure detected by the negative pressure sensor 34 based on detection result or information of the gas phase temperature sensor 22. For example, the ECU 20 revises the negative pressure detected by the negative pressure sensor 34 such that such a negative pressure is increased as the temperature of the gas phase detected by the gas phase temperature sensor 22 increases. To the contrary, the ECU 20 revises the negative pressure detected by the negative pressure sensor 34 such that such a negative pressure is reduced as the temperature of the gas phase detected by the gas phase temperature sensor 22 decreases. Further, such a revision by ECU 20 may be performed in a continuous or stepwise fashion as necessary.

Further, the ECU 20 determines as to whether there is a possibility of vapor generation in the fuel F stored in the fuel tank 12, based on the detection information of the gas phase temperature sensor 22. When the temperature of the gas phase in the fuel tank 12 is less than a predetermined temperature, there is no possibility of vapor generation. Therefore, when the ECU 20 determines that there is no possibility of vapor generation in the fuel F stored in the fuel tank 12 on the basis that the temperature of the gas phase in the fuel tank 12 is less than the predetermined temperature, the ECU 20 closes the on-off valve 30, thereby stopping introduction of the fuel F into the aspirator 28. Further, when the ECU 20 determines that there is a possibility of vapor generation in the fuel F stored in the fuel tank 12 on the basis that the temperature of the gas phase in the fuel tank 12 is increased to the predetermined temperature or more, the ECU 20 opens the on-off valve 30 again.

Further, the ECU 20 determines as to whether there is a possibility of vapor generation in the fuel F stored in the fuel tank 12, based on detection result or information of the tank inner pressure sensor 24. When the pressure of the gas phase in the fuel tank 12 is less than a predetermined pressure, there is no possibility of vapor generation. Therefore, when the ECU 20 determines that there is no possibility of vapor generation in the fuel F stored in the fuel tank 12 on the basis that the pressure of the gas phase in the fuel tank 12 is less than the predetermined pressure, the ECU 20 closes the on-off valve 30, thereby stopping introduction of the fuel F into the aspirator 28. Further, when the ECU 20 determines that there is a possibility of vapor generation in the fuel F stored in the fuel tank 12 on the basis that the pressure of the gas phase in the fuel tank 12 is increased to the predetermined pressure or more, the ECU 20 opens the on-off valve 30 again.

According to the embodiment, when the ECU 20 determines the sign of vapor generation in the fuel F stored in the fuel tank 12 based on detection information of the negative pressure sensor 34 that is configured to detect the negative pressure generated by the aspirator 28, the ECU 20 increases the revolution speed of the fuel pump 14, thereby preventing the fuel pump 14 from generating the vapor lock.

Further, when the ECU 20 determines that there is no possibility of vapor generation in the fuel F stored in the fuel tank 12, based on the detection information of the gas phase temperature sensor 22, the on-off valve 30 is closed. As a result, introduction of the fuel F into the aspirator 28 is stopped, thereby increasing the pumping efficiency of the fuel pump 14.

Further, the ECU 20 is configured to revise the negative pressure detected by the negative pressure sensor 34 based on the detection information of the gas phase temperature sensor 22. Therefore, the sign of vapor generation in the fuel F can be determined more accurately.

Further, when the ECU 20 determines that there is no possibility of vapor generation in the fuel F stored in the fuel tank 12, based on the detection information of the tank inner pressure sensor 24, the on-off valve 30 is closed. As a result, introduction of the fuel F into the aspirator 28 is stopped, thereby increasing the pumping efficiency of the fuel pump 14.

Naturally, various changes and modifications may be made to the fuel-feeding device 10.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A fuel-feeding device, comprising:
    a fuel tank storing fuel therein;
    a fuel pump configured to feed the fuel in the fuel tank to an engine through a fuel-feeding conduit extending from the fuel tank;
    an aspirator disposed along a branched conduit extending from the fuel-feeding conduit, wherein the aspirator is configured to generate a negative pressure therein in response to a flow of the fuel flowing through the branched conduit from the fuel-feeding conduit;
    a negative pressure sensor configured to detect the negative pressure generated by the aspirator; and
    a control device configured to control a revolution speed of the fuel pump,
    wherein the control device is configured to determine a sign of vapor generation in the fuel stored in the fuel tank based on the negative pressure detected by the negative pressure sensor and to increase the revolution speed of the fuel pump when such a sign is determined.

2. The fuel-feeding device of claim 1, further comprising:
    an on-off valve disposed along the branched conduit and configured to open and close the branched conduit; and
    a gas phase temperature sensor coupled to the fuel tank and configured to detect a gas phase temperature in the fuel tank,
    wherein the control device is configured to open the on-off valve in a normal state and to close the on-off valve when the control device determines that there is no possibility of vapor generation in the fuel stored in the fuel tank based on the gas phase temperature detected by the gas phase temperature sensor.

3. The fuel-feeding device of claim 2, wherein the control device is configured to revise the negative pressure detected by the negative pressure sensor based on the gas phase temperature detected by the gas phase temperature sensor.

4. The fuel-feeding device of claim 1, further comprising:
an on-off valve disposed along the branched conduit and configured to open and close the branched conduit; and
a tank inner pressure sensor coupled to the fuel tank and configured to detect a tank inner pressure of the fuel tank,
wherein the control device is configured to open the on-off valve in a normal state and to close the on-off valve when the control device determines that there is no possibility of vapor generation in the fuel stored in the fuel tank based on the tank inner pressure detected by the tank inner pressure sensor.

5. A fuel-feeding device, comprising:
a fuel tank storing fuel therein;
a fuel pump configured to feed the fuel in the fuel tank to an engine through a fuel-feeding conduit extending from the fuel tank;
an aspirator disposed along a branched conduit extending from the fuel-feeding conduit, wherein the aspirator is configured to generate a negative pressure therein using a flow of the fuel flowing through the branched conduit from the fuel-feeding conduit;
a negative pressure sensor configured to detect the negative pressure generated by the aspirator; and
a control device configured to control a revolution speed of the fuel pump,
wherein the control device is configured to determine that when the negative pressure detected by the negative pressure sensor is reduced to a level lower than a predetermined negative pressure, such a reduction of the detected negative pressure is a sign of vapor generation in the fuel stored in the fuel tank.

* * * * *